(12) United States Patent
Epitaux et al.

(10) Patent No.: US 7,389,021 B2
(45) Date of Patent: Jun. 17, 2008

(54) MOVABLE LENS BEAM STEERER

(76) Inventors: Marc Epitaux, 835 S. Knickerbocker Dr., Sunnyvale, CA (US) 94087; Wilfried Noell, Rue de l'Observatoire 30, Neuchatel (CH) 2000; Yves Petremand, Rue du Millieu 19, Yverdon-les-Bains (CH) 1400; Nicolaas-F. De Rooij, Rue Observatoire 34, Neuchatel (CH) 2000

( * ) Notice: Subject to any disclaimer, the term of this patent is extended or adjusted under 35 U.S.C. 154(b) by 0 days.

(21) Appl. No.: 11/851,971

(22) Filed: Sep. 7, 2007

(65) Prior Publication Data

US 2007/0297041 A1  Dec. 27, 2007

Related U.S. Application Data

(63) Continuation of application No. 10/832,598, filed on Apr. 27, 2004, now Pat. No. 7,283,703.

(51) Int. Cl.
*G02B 6/42* (2006.01)
*G02B 6/32* (2006.01)
*G02B 25/02* (2006.01)
*G02F 1/29* (2006.01)

(52) U.S. Cl. .............................. 385/35; 385/31; 385/33; 359/230; 359/315

(58) Field of Classification Search ................... 385/31, 385/33, 35
See application file for complete search history.

(56) References Cited

U.S. PATENT DOCUMENTS

| 6,091,537 | A  | 7/2000 | Sun et al. |
| 6,912,090 | B2 | 6/2005 | Kornblit et al. |
| 2002/0105699 | A1 | 8/2002 | Miracky et al. |

OTHER PUBLICATIONS

Microlens 2D Scanners by Photoresist Reflow Technique, Toshiyoshi, H., Institute of Industrial Science, Univ. of Tokyo, Jun. 2001.
AFM imaging with an xy-micropositioner with integrated tip, P.-F. Indermuhle et al., Sensors and Acuators A, vol. 46-47, 1995.
Microelectromechanical Systems Laboratory, Carnegie Mellon University MEMS Laboratory, date unknown, prior to Apr. 27, 2004.

*Primary Examiner*—M. R. Connelly-Cushwa
*Assistant Examiner*—Rhonda S Peace
(74) *Attorney, Agent, or Firm*—Schwabe, Williamson & Wyatt, P.C.

(57) ABSTRACT

Embodiments of a system are described herein, and include a controller, and an optoelectronic module coupled to the controller. The optoelectronic module has a substrate, and a stage having a lens. An electromechanical subsystem is coupled to the substrate and to the stage, to hold the stage in a suspended manner over the substrate, and is adapted to move and lock in place the stage to position the lens to steer a light beam, responsive to control signals. A network interface module comprises the optoelectronic module.

17 Claims, 4 Drawing Sheets

MOVABLE LENS BEAM STEERER

CROSS REFERENCE TO RELATED APPLICATIONS

The present application is a continuation of and claims priority to U.S. patent application Ser. No. 10/832,598, filed Apr. 27, 2004, entitled "MOVABLE LENS BEAM STEERER," the entire contents of which is hereby incorporated by reference in its entirety.

FIELD OF THE INVENTION

The present invention relates generally to the field of optoelectronic, and in particular, to optoelectronic modules (e.g. transmitter or receiver) with a microlens positioner/beam steerer.

BACKGROUND OF THE INVENTION

Optoelectronic applications often have a need to steer a light beam or light of an optoelectronic read/write device, or a location of an optical fiber of an optoelectronic transmitter/receiver module. Currently, the latter is typically performed at the time of packaging.

Optoelectronics packaging is one of the most difficult and costly operations in optoelectronics manufacturing. Process manufacturing like submicron alignment between optical elements, high speed electrical connections, excellent heat dissipation, and high reliability present a myriad of challenges.

In the case of optoelectronic module, it is difficult to align a laser diode with the optical lens and fiber, especially during construction of the package. The process of aligning these components to a laser diode and fixing the components in place is known in the art as fiber pigtailing. Current designs use numerous parts in complex three dimensional arrangements and need high degree of accuracy and automation.

Today, virtually a standard of the optoelectronic industry, very costly and very big laser welding stations, that literally takes up the space of an entire standard office, are employed to carry out the optical alignment of these components. Their functions are to align the components with optical feedback mechanism, a process called "active alignment", and then freeze the alignment by a laser welding attachment process.

Nevertheless, the welding process often causes a shift to occur in the structure being welded, due to shrinkage of the molten weld material while it is solidifying. Further, even though a component may be aligned prior to welding, the alignment may nevertheless be off after welding, as the welding process itself may shift the components. Moreover all subsequence assembly operations can also cause misalignment to the optical train by mishandling, thermal treatment, shock, vibration, and so forth. Where micron accuracy is needed, these shifting during the welding process affect the overall yield of manufacturing. Current techniques to reduce the effect of such during and post welding shifts, include pre-compensation, laser hammering or bending of the parts after welding.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include, but are not limited to, a lens positioning/beam steering arrangement and method, an optoelectronic module equipped with such capability, and a system having such an optoelectronic module.

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials, and configurations are set forth in order to provide a thorough understanding of the illustrative embodiments. In particular, various elements of the embodiments will be described at a micro scale level. However, it will be apparent to one skilled in the art that the present invention may be practiced without the specific details and/or at different scale level, e.g. at the nano scale. In other instances, well-known features are omitted or simplified in order not to obscure the illustrative embodiments.

The phrase "in one embodiment" is used repeatedly. The phrase generally does not refer to the same embodiment; however, it may. The terms "comprising", "having" and "including" are synonymous, unless the context dictates otherwise.

Figure 1:
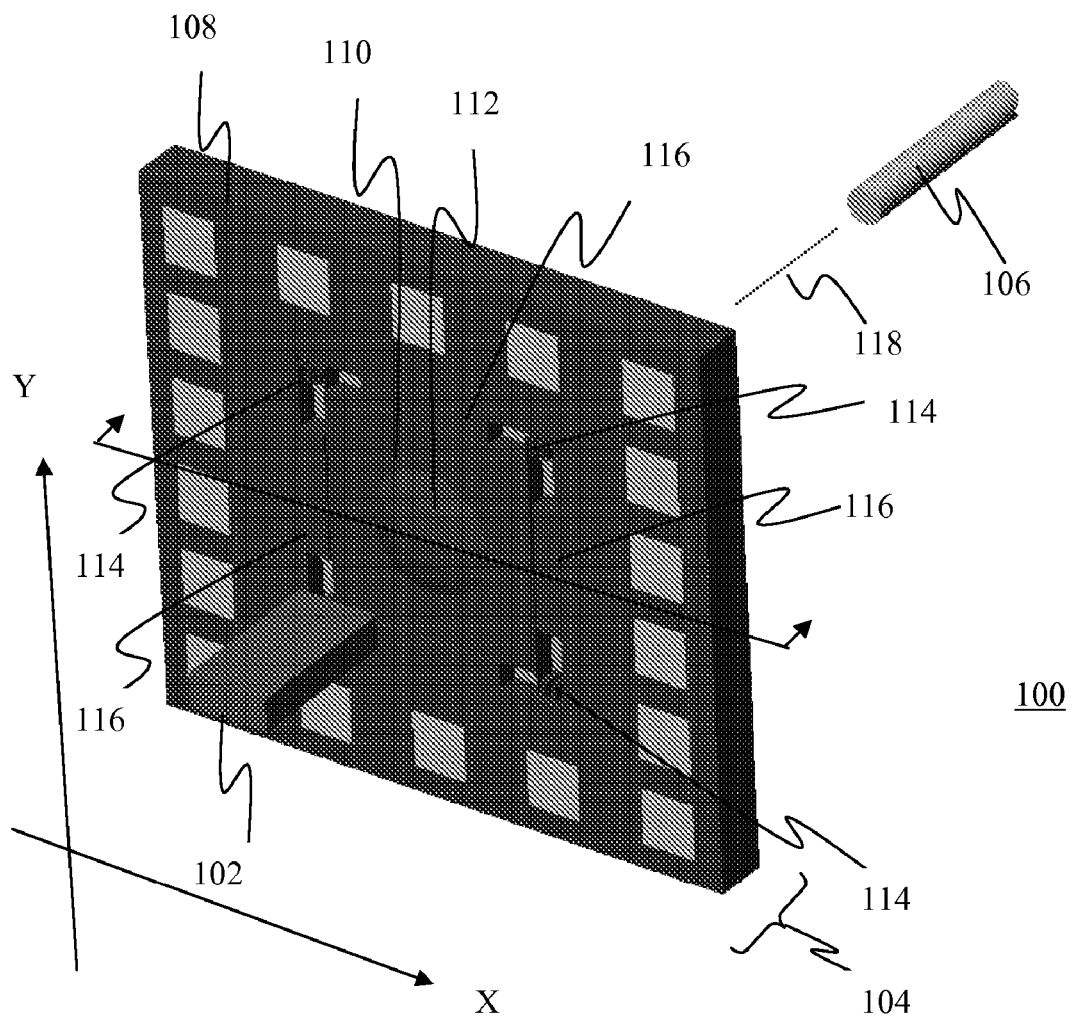
FIG. 1 illustrates a partial exploded view of an optoelectronic module having a microlens and a positioning/steering arrangement to enable the microlens to be re-positionable and a light beam to be steered, in accordance with an embodiment of the present invention.

Referring now to FIG. 1, wherein a partial exploded view of an optoelectronic module having a microlens and a lens positioning arrangement to enable the microlens to be re-positionable to adjust steering of a light beam, in accordance with one embodiment, is shown. As illustrated, optoelectronic module 100 includes light source 102, microlens 112, positioner/steerer 104, and optical fiber 106, operationally coupled to each other. For the embodiment, positioner/steerer 104 includes in particular, stage 110, on which microlens 112 is disposed. In various embodiments, microlens 112 may be attached to stage 110 or integrally formed on stage 110. Regardless, as will be described in more detail below, positioner/steerer 104 is adapted to enable microlens 112 to be positioned to a desired operational location of optoelectronic module 100. The desired operational location may e.g. be a location where microlens 112 will be in alignment with light source 102 and optical fiber 106, steering light bundles 118 outputted by light source 102 onto optical fiber 106. Further, the lens re-positioning/beam steering may be performed post assembly of optoelectronic module 100.

In alternate embodiments, the desired operational location may e.g. be a location of an optically readable medium. However, for ease of understanding, the remaining description will be presented substantially in the context of the embodiments of FIG. 1, but one of ordinarily skill in the art will appreciate the application to optoelectronic reader/writer and other embodiments.

Continuing to refer to FIG. 1, as those skilled in the art would also appreciate, by virtue of this capability of positioner/steerer 104 to movably re-position microlens 112 post assembly of optoelectronic module 100, and steer a light beam or light bundles outputted by light source 102 onto optical fiber 106, significant improvement in quality and reliability, and/or reduction in manufacturing cost may be achieved for optoelectronic module 100.

While quality and reliability are expected to be better if microlens 112 is positioned post assembly of optoelectronic module 100, avoiding any post positioning assembly from impacting the alignment, positioner/steerer 104 may nonetheless be used to position microlens 112 before all assembly is completed, if for some applications, the higher degree of quality and reliability is not needed. Moreover, the positioning may be performed with the assembly of optoelectronic module being substantially completed. For the purpose of the present application, the term "substantial completion" refers to a point in time, beyond which the potential impact on the alignment of microlens 112 with light source 102 and optical fiber 106, is considered to be inconsequential or insignificant in view of the quality and reliability desired.

Continuing to refer to FIG. 1, in various embodiments, light source 102 may be a semiconductor light source, employed to output a laser light bundle 118, modulation of which, enables data to be optically encoded therein. In various embodiments, the semiconductor light source 102 may be a laser diode. In alternate embodiments, other semiconductor light sources may be employed.

In various embodiments, optical fiber 106 may be a single mode fiber (SMF). In alternate embodiments, it may be multi-mode fiber (MMF).

Figure 2:
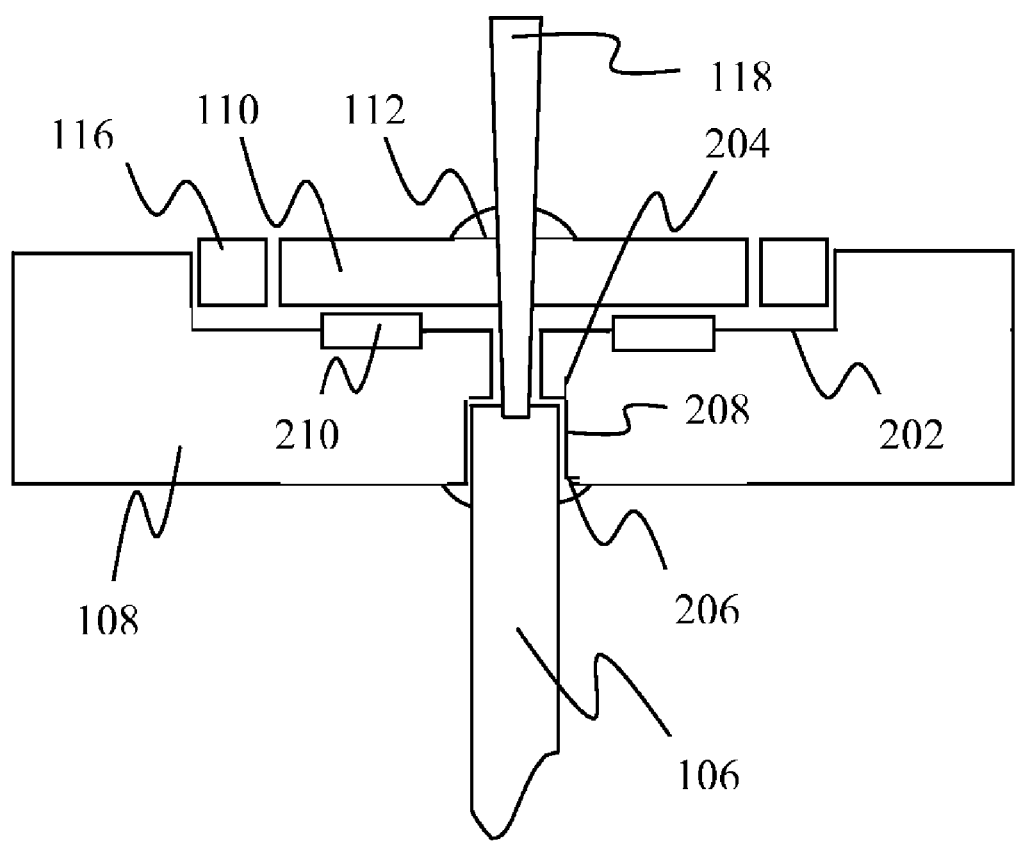
FIG. 2 illustrates a partial cross sectional view of the optoelectronic module FIG. 1.

Referring now also to FIG. 2, wherein a partial cross sectional view of the positioner/steerer 104, in accordance with one embodiment, is shown. The partial cross sectional view is taken along the arrowed axis depicted in FIG. 1. As illustrated, in addition to microlens 112, positioner/steerer 104 further includes substrate 108, to which stage 110 is operatively coupled to.

Further, for the embodiment, substrate 108 include trench 208 for receiving optical fiber 106. For the embodiment, trench 208 includes stopper 204 to facilitate proper attachment of optical fiber 106. Stopper 204 identifies the depth of insertion into substrate 108 for optical fiber 106. In various embodiments, substrate 108 is formed with silicon-on-insulator. In alternate embodiments, substrate 108 may be a silicon substrate. In various embodiments, trench 208 is orthogonal to top surface 202 of substrate 108, and trench 208 may be created using deep reactive ion etching. In various embodiments, upon attachment of one end of optical fiber 106 in trench 208, the remaining gap of the opening may be sealed with a suitable sealant 206.

In various embodiments, stage 110 is formed with a ceramic material. In alternate embodiments, stage 110 may be formed with semi-conductive material like silicon. In various embodiments, microlens 112 is etched onto stage 110. More specifically, stage 110 is substantially rectangular in shape, and microlens 112 is disposed substantially at the center of stage 110. In alternate embodiments, stage 110 may assume other shapes, microlens 112 may be disposed in an off-center location, and it may be attached to stage 110 via other attachment methods beside etching.

In various embodiments, stage 110 with microlens 112 is attached to substrate 108 in a suspended manner across top surface 202 of substrate 108. In various embodiments, stage 110 with microlens 112 is attached to substrate 108 in a suspended manner, employing compliant suspension beams 114. For the embodiment, where stage 110 and substrate 108 are both substantially rectangular in shape, the respective ends of compliant suspension beams 114 are attached to the four corresponding corners of stage 110 respectively, thereby attaching stage 110 to substrate 108 in the suspended manner.

In various embodiments, compliant suspension beams 114 are adapted to be compressable or extendable. Resultantly, complementary compressions and/or extensions of compliant suspension beams 114 facilitate movements of stage 110 in the X and/or Y directions, enabling microlens 112 to be movably re-positionable. More importantly, through the re-positioning of microlens 112, microlens 112 may be in better alignment with light source 102 and optical fiber 106, and laser light bundles 118 may be more optimally steered onto optical fiber 106.

In various embodiments, movements of stage 110, and therefore microlens 112 are effectuated employing electrostatic principles, more specifically, through the use of electrodes 116. For the embodiments, electrodes 116 are proximally disposed adjacent to corresponding sides of stage 110. Through complementary and selective activation/deactivation of electrodes 116, stage 110, and therefore microlens 112 may be moved for a distance in any one of the X/–X and/or Y/–Y directions. In various embodiments, the amount of displacements of stage 110, and therefore movement of microlens 112, is dependent on the level electrodes 116 are complementarily energized. In other words, by controlling the level electrodes 116 are energized, the distances moved by stage 110, and therefore, microlens 112 may be controlled. In various embodiments, the level electrodes 116 may be energized is variable. In various embodiments, the level electrodes 116 may be energized may also be different from each other. That is, the amount of movements to be effectuated in the X/–X or Y/–Y directions may be variable. Further, movement in a selected one of the Y or –Y directions may also be effectuated substantially at the same time, while effectuating movement in the X/–X direction. Similarly, movement in a selected one of the X or –X directions may also be effectuated substantially at the same time, while effectuating movement in the Y/–Y direction.

In various alternate embodiments, other physical principles may be employed to move stage 110, and therefore re-position microlens 112. For examples, stage 110 may be moved based on electromagnetic, piezoelectric bimorph, thermal bimorph, and so forth.

Still referring to FIG. 1-2, in various embodiments, a number of electrode features 210 may also be provided on top surface 202 of substrate 108 under stage 110. Electrode features 210 may be activated to reversibly attract and hold stage 110 to substrate 108, and render stage 110 (and therefore, microlens 112) unmoveable by the mechanism employed to move them. The operation may e.g. be performed after microlens 112 having been positioned to the desired operational location. In various embodiments, one or more regions of substrate 108 may comprise conductive or semi-conductive features that may be energized to effectuate the reversible attract and hold function, in lieu of or in addition to the employment of electrode features 210. In yet other embodiments, activatable features may be provided to irreversibly attach and hold stage 110 to substrate 108 (on activation of these features). For examples, features may be provided to bond or fuse stage 110 to substrate 108 (on activation of the features).

As those skilled in the art would appreciate, for some applications, after operation for a period of time, for various reasons, microlens 112 may be considered "misaligned" with light sources 102 and/or optical fiber 106, which may raise quality and/or reliability issues. Thus, in various embodiments with the reversible attach and hold function, electrode features 210 (and/or regions of substrate 108) may be deactivated to render stage 110, and therefore microlens 112 moveable again (to facilitate re-alignment).

The re-positioning and lock down process may be repeated any number of times as desired. In particular, various sensors may be provided to sense one or more outputs of optoelectronic module 100, and have the re-positioning and lock down process be re-performed in view of the data collected by the sensors.

In various embodiments, as with electrode features 116, the holding or lock down provision may be effectuated in accordance with other physical principles, electromagnetic, piezoelectric bimorph, and so forth.

In alternate embodiments, other arrangements may be employed to effectuate the desired re-positioning of microlens 112. In particular, in various embodiments, MEMS drive arrangements may be employed to provide mobility to microlens 112. Various embodiments of suitable MEMS drive arrangements are described in the co-pending application entitled "ELECTROMECHANICAL DRIVES ADAPTED TO PROVIDE TWO DEGREES OF MOBILITY," having same the inventorship with the present invention, filed contemporaneously, and having issued as U.S. Pat. No. 7,187, 486.

Figure 3:
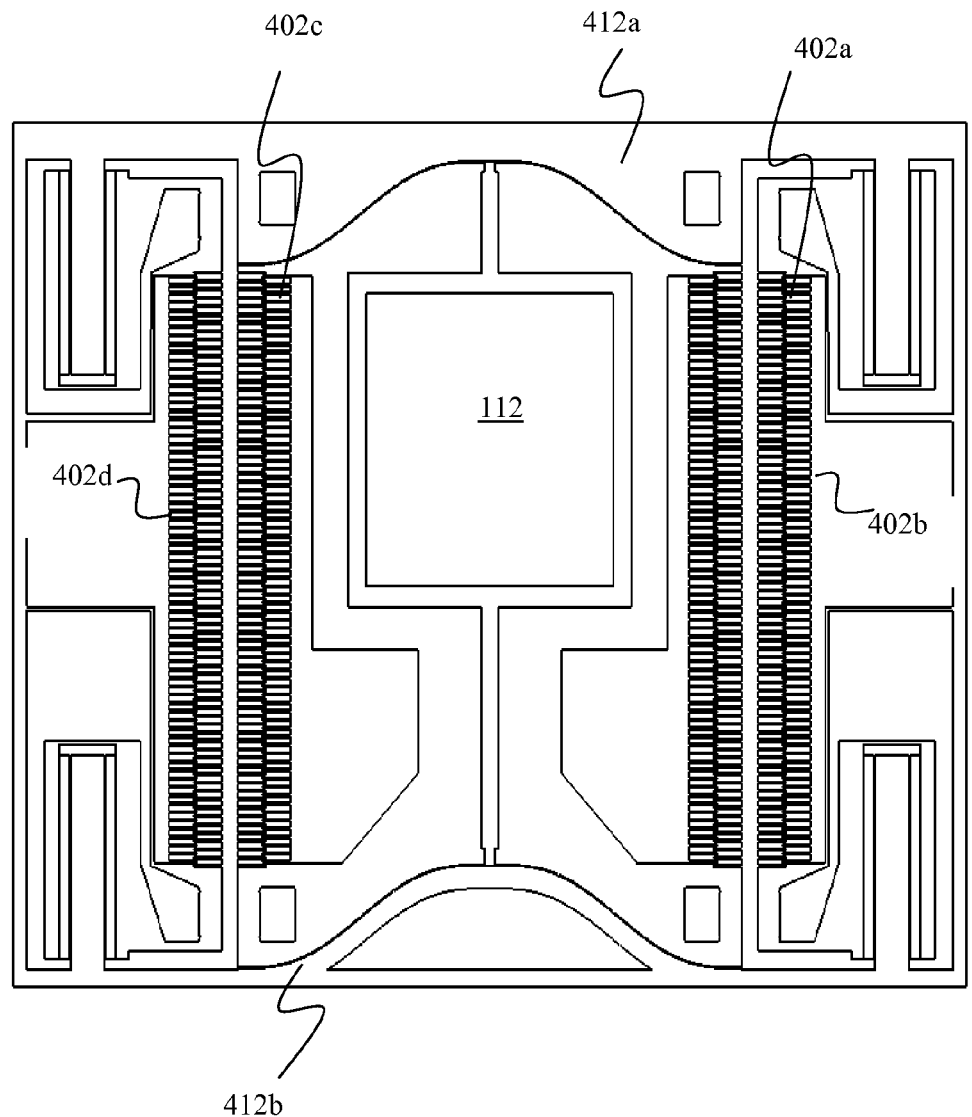
FIG. 3 illustrates a top view of a MEMS drive arrangement to provide the microlens with two degrees of mobility, in accordance with one embodiment.

One embodiment of the various MEMS drive arrangements described in the above identified patent is illustrated in FIG. 3. Briefly, for the embodiment, microlens 112 is coupled to compliant suspension beams 412a-412b, which ends are coupled to micro drives 402c-402d and 402a-402b respectively. Micro drives 402c-402d and 402a-402b are selectively and complementarily activated to move, compress or extend compliant suspension beams, to move microlens 112. In various embodiments, micro drives 402c-402d and 402a-402b also operate in accordance with electrostatic principles.

Except for the novel positioner/steerer 104, optoelectronic module 100 otherwise represent a broad range of such module.

Figure 4:
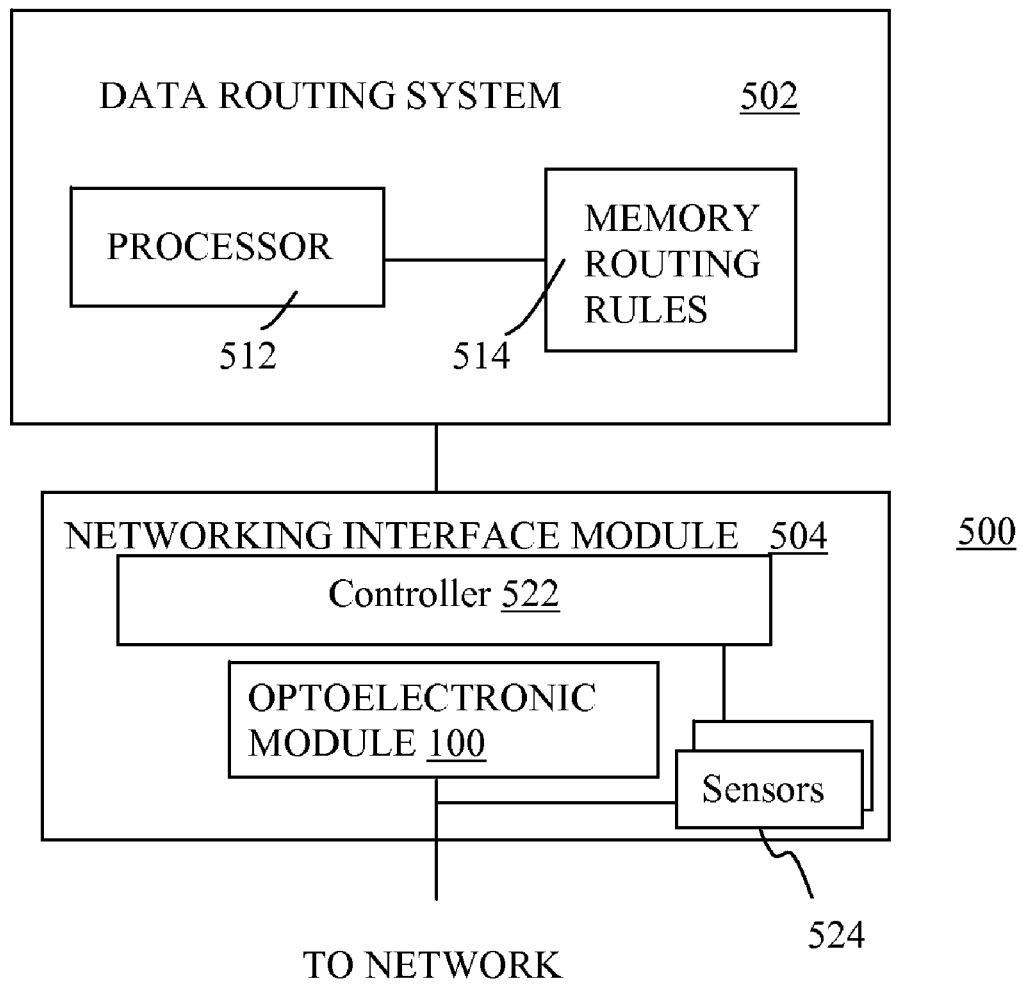
FIG. 4 illustrates an example system having the optoelectronic module of FIG. 1, in accordance with one embodiment.

FIG. 4 illustrates an example communication system, in accordance with one embodiment. As illustrated, example system 500 includes data routing subsystem 502 and network interface module 504 coupled to each other as shown. Network interface module 504 is employed to optically couple communication system 500 to a network, which may be a local area network, a wide area network, a telephone network, and so forth. These networks may be private and/or public. For the embodiment, network interface module 504 includes in particular, optoelectronic module 100 of FIG. 1, having light source 102 and positioner/steerer 104 as earlier described. For the purpose of this specification, network interface module 504 may also be referred to as a communication interface module.

Still referring to FIG. 4, for the embodiment, data routing subsystem 502 includes processor 512 and memory 514 coupled to each other as shown. Memory 514 has stored therein a number of data routing rules, according to which processor 512 routes data received through networking interface module 504. The data routing rules may be stored employing any one of a number of data structure techniques, including but are not limited to e.g. tables, link lists, and so forth. The data may be received and forwarded in accordance with any one of a number of communication protocols, including but are not limited to e.g. the Transmission Control Protocol/Internet Protocol (TCP/IP).

In various embodiments, the tasks performed by processor 512 may include controlling the earlier described selective control of electrodes 116 to effectuate movement of stage 110 (or drives 402a-402d), and therefore re-positioning of microlens 112. In alternate embodiments, the actual controlling may be delegated to one or more other controllers, e.g. controller 522. That is, processor 512 effectuates the desired controls via these other controllers.

Further, in various embodiments, data routing system 500 may also include one or more sensors 524 to collect one or more performance metrics of system 500, e.g. temperatures of one or more locations, and a controller 522 to control the elements of module 100, in particular, the elements used to move microlens 112, based on the data collected for the performance metrics. The sensors may also be coupled to processor 512 instead. For the embodiment, sensors 524 and controller 522 are disposed within network interface module 504. In alternate embodiments, they may be disposed in other parts of system 500.

Except for the incorporation of optoelectronic module 100, having positioner/steerer 104, with network interface module 504, elements 502-504 represent a broad range of these elements known in the art or to be designed In various embodiments, example system 500 may be a router, a switch, a gateway, a server, and so forth.

In various embodiments, example system 500 may further include an optoelectronic reader/writer device having the lens positioner/beam steerer 104 of FIG. 1, for storing and retrieving of data. In various embodiments, example system 500 may use the optoelectronic reader/writer device having the lens positioner/beam steerer 104 of FIG. 1 for other non-data routing applications, in addition to or in lieu of the data routing application.

Thus, a novel optoelectronic module 100 with a lens that may be re-positioned to adjust steering of a light beam has been described. Although specific embodiments have been illustrated and described herein, it will be appreciated by those of ordinary skill in the art that a wide variety of alternate and/or equivalent implementations may be substituted for the specific embodiments shown and described, without departing from the scope of the present invention. This application is intended to cover any adaptations or variations of the embodiments discussed herein. Therefore, it is manifestly intended that this invention be limited only by the claims and the equivalents thereof.

What is claimed is:

1. A system comprising:
a controller; and
an optoelectronic module coupled to the controller, having:
    a substrate;
    a stage having a lens; and
    an electromechanical subsystem coupled to the substrate and the stage, to hold the stage in a suspended manner over the substrate, and adapted to move and lock in place the stage to position the lens to steer a light beam, responsive to control signals; and
a network interface module comprising the optoelectronic module;
a memory having a plurality of data routing rules; and
a processor coupled to the network interface module and the memory to route data based at least in part on the data routing rules.

2. The system of claim 1, wherein the electromechanical subsystem of the optoelectronic module comprises a plurality of compliant suspension beams, to which the stage is attached, and a plurality of electrode features complementarily disposed adjacent to the stage, to be employed to electrostatically move and lock in place the stage, after substantial completion of assembly of the optoelectronic module.

3. The system of claim 1, wherein the electromechanical subsystem of the optoelectronic module comprises a plurality of drives attached to the substrate of the optoelectronic module, a plurality of compliant suspension beams attached to the drives, and the stage of the optoelectronic module is attached to the compliant suspension beams of the optoelectronic module, where the drives move the stage by compressing, extending or moving the compliant suspension beams.

4. The system of claim 1, wherein the optoelectronic module further comprises a light source, the substrate of the optoelectronic module comprises a trench, and the network interface module further comprises an optical fiber having one end disposed in the trench of the optoelectronic module, and light outputted by the light source of the optoelectronic module is focused onto the optical fiber by the lens of the optoelectronic module, which is aligned with the light source and the optical fiber by moving the stage.

5. The system of claim 1, wherein
the controller is adapted to control the electromechanical subsystem; and
the system further comprises one or more sensors to sense one or more outputs of the system, and to provide feedback to the controller on said one or more outputs, and the controller is adapted to control the electromechanical subsystem based at least in part on the feedback.

6. The system of claim 1, wherein the processor is adapted for selective control of the electrodes to effectuate movement of the stage.

7. A system comprising:
a controller;
an optoelectronic module coupled to the controller, having:
a substrate;
a stage having a lens;
an electromechanical subsystem coupled to the substrate and the stage, to hold the stage in a suspended manner over the substrate, and adapted to move and lock in place the stage to position the lens to steer a light beam, responsive to control signals;
wherein the controller is adapted to control the electromechanical subsystem;
the system further comprises one or more sensors to sense one or more outputs of the system, and to provide feedback to the controller on said one or more outputs, and the controller is adapted to control the electromechanical subsystem based at least in part on the feedback; and
wherein the system further comprises a network interface module comprising the optoelectronic module, and at least a selected one from the group consisting the one or more sensors and the controller.

8. The system of claim 7, wherein the electromechanical subsystem of the optoelectronic module comprises a plurality of compliant suspension beams, to which the stage is attached, and a plurality of electrode features complementarily disposed adjacent to the stage, to be employed to electrostatically move and lock in place the stage, after substantial completion of assembly of the optoelectronic module.

9. The system of claim 7, wherein the electromechanical subsystem of the optoelectronic module comprises a plurality of drives attached to the substrate of the optoelectronic module, a plurality of compliant suspension beams attached to the drives, and the stage of the optoelectronic module is attached to the compliant suspension beams of the optoelectronic module, where the drives move the stage by compressing, extending or moving the compliant suspension beams.

10. The system of claim 7, wherein the optoelectronic module further comprises a light source, the substrate of the optoelectronic module comprises a trench, and the network interface module further comprises an optical fiber having one end disposed in the trench of the optoelectronic module, and light outputted by the light source of the optoelectronic module is focused onto the optical fiber by the lens of the optoelectronic module, which is aligned with the light source and the optical fiber by moving the stage.

11. The system of claim 7, wherein the processor is adapted for selective control of electrodes to effectuate movement of stage.

12. A system comprising:
a controller; and
an optoelectronic module coupled to the controller, having
a substrate;
a stage having a lens;
an electromechanical subsystem coupled to the substrate and the stage, to hold the stage in a suspended manner over the substrate, and adapted to move and lock in place the stage to position the lens to steer a light beam, responsive to control signals; and
a network interface module comprising the optoelectronic module adapted to optically couple the system to a network.

13. The system of claim 12, wherein the electromechanical subsystem of the optoelectronic module comprises a plurality of compliant suspension beams, to which the stage is attached, and a plurality of electrode features complementarily disposed adjacent to the stage, to be employed to electrostatically move and lock in place the stage, after substantial completion of assembly of the optoelectronic module.

14. The system of claim 12, wherein the electromechanical subsystem of the optoelectronic module comprises a plurality of drives attached to the substrate of the optoelectronic module, a plurality of compliant suspension beams attached to the drives, and the stage of the optoelectronic module is attached to the compliant suspension beams of the optoelectronic module, where the drives move the stage by compressing, extending or moving the compliant suspension beams.

15. The system of claim 12, wherein the optoelectronic module further comprises a light source, the substrate of the optoelectronic module comprises a trench, and the network interface module further comprises an optical fiber having one end disposed in the trench of the optoelectronic module, and light outputted by the light source of the optoelectronic module is focused onto the optical fiber by the lens of the optoelectronic module, which is aligned with the light source and the optical fiber by moving the stage.

16. The system of claim 12, wherein
the controller is adapted to control the electromechanical subsystem; and
the system further comprises one or more sensors to sense one or more outputs of the system, and to provide feedback to the controller on said one or more outputs, and the controller is adapted to control the electromechanical subsystem based at least in part on the feedback.

17. The system of claim 12, further comprising a processor coupled with the network interface module, the processor is adapted for selective control of electrodes to effectuate movement of stage.

* * * * *